United States Patent Office 3,297,856
Patented Jan. 10, 1967

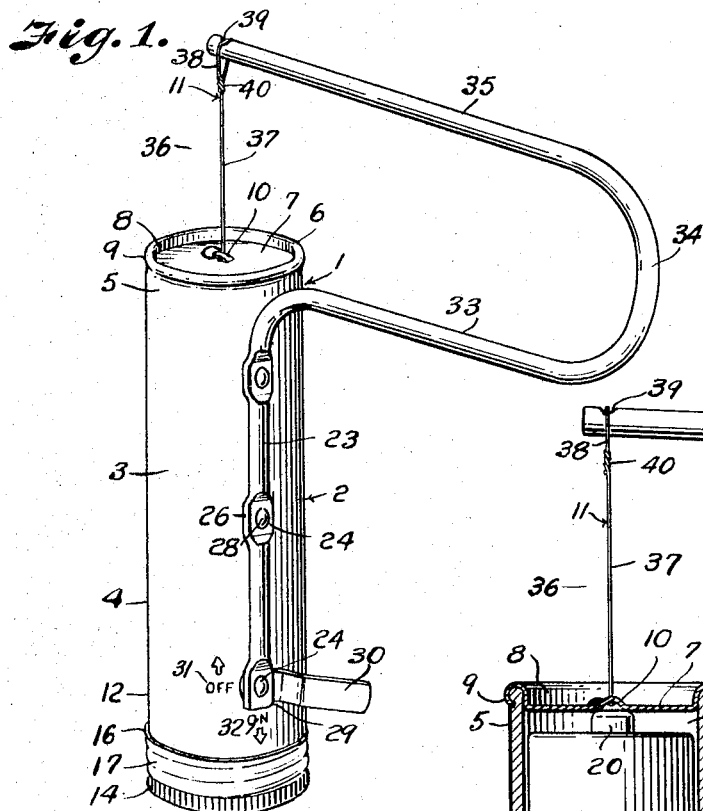
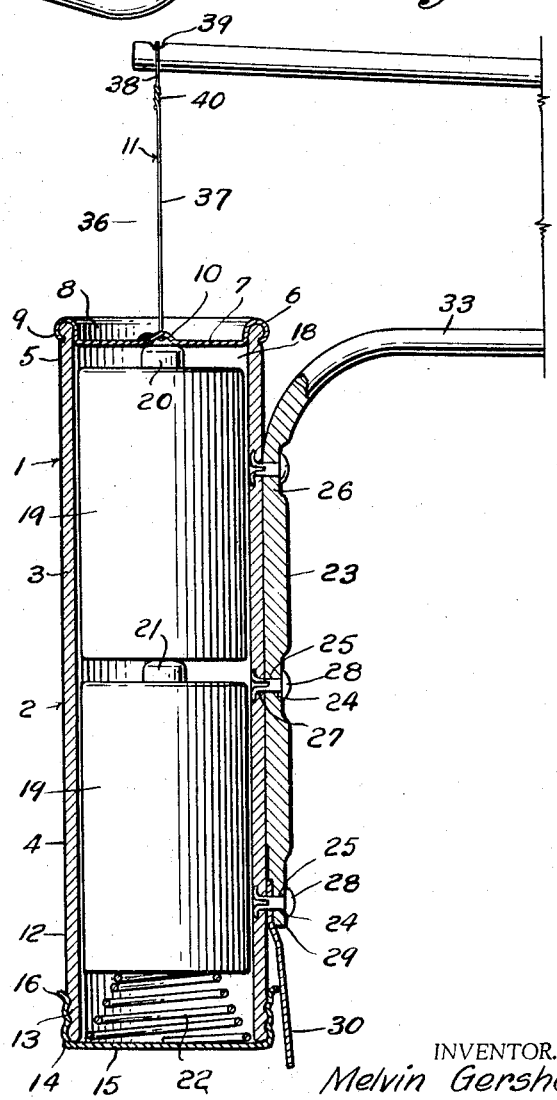
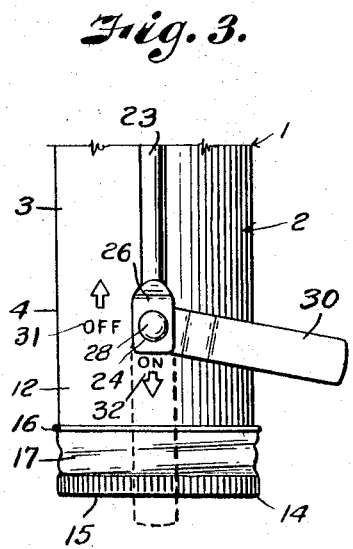

3,297,856
ELECTRICALLY HEATED TOOL FOR
CUTTING PLASTICS
Melvin Gershon, c/o Wonder Products, Inc., Merchandise
Mart Bldg., 2201 Grand Ave., Kansas City, Mo.
64108
Filed July 30, 1964, Ser. No. 386,361
3 Claims. (Cl. 219—233)

This invention relates to a tool for cutting various shapes from plastics and similar materials, such as expanded polystyrene sheets, by means of a wire heated by resistance to flow of electric current.

The principal objects of the invention are to provide a tool of this character which is of simple and inexpensive construction, and which incorporates the parts thereof, including a current supply, in a portable unit that is readily manipulated by hand, much in the manner of a coping saw.

In carrying out the invention, the tool includes a battery case containing dry cells therein and which has a gooseneck frame attached to the side of the battery case for cooperating with a metal closure at one end of the case in supporting the cutting element, such as a small resistance wire, and in which the frame is electrically connected with a metal closure cap of the battery case by means of a simple switch to complete the circuitry between the dry cells and the cutting element, as illustrated in the accompanying drawings, wherein:

FIG. 1 is a perspective view of a tool embodying the features of the present invention, for cutting plastics and like materials.

FIG. 2 is an enlarged sectional view through the tool, particularly illustrating the circuitry thereof.

FIG. 3 is a fragmentary elevation of the lower portion of the battery case and frame, and illustrating the switch for controlling flow of electric current through the cutting element.

Referring more in detail to the drawings:

1 designates a tool constructed in accordance with the present invention and which includes a battery case 2 having a tubular wall 3 of insulating material and which provides the handle 4 of the tool. The upper end 5 of the tubular wall 3 is closed by a cap 6 of conductive material, and which includes a disk portion 7 inset into the end of the wall by means of an annular flange 8 that has the outer periphery thereof crimped or rolled over the end 5 of the wall 3 and about the outer face thereof, as indicated at 9. Struck from the center of the disk portion 7 is a hook or loop 10 that forms an anchor for one end of the cutting element 11, later to be described. The opposite end 12 of the tubular wall of the case has threads 13 that may be provided by pressing them into the material of the tube to removably connect a closure cap 14. The closure cap 14 is also formed of electrically conductive material, and includes a disk portion 15 having a peripheral flange 16 provided with threads 17 to engage the threads 13.

The case thus constructed provides a compartment 18 for containing therein one or more small dry cells 19. I find that a very small and low voltage current is sufficient to provide the necessary heat, so that in the illustrated instance the battery case 2 is of sufficient size and length to contain two dry cells 19 of the type used in flashlights, arranged in series, with the positive pole 20 of the uppermost battery bearing against the disk portion 7 of the upper cap 6, and the positive pole 21 of the lower battery contacting the bottom casing of the cell above, and with the contacts being positively maintained by means of a spring 22 having its inner end bearing against the bottom of the lowermost cell and its outer end seating upon the disk portion 15 of the removable cap.

Carried by one side of the tubular wall 3 of the battery case is a shank 23 that is formed of electrically conductive material. The shank 23 of the frame is secured to the wall of the battery case at a plurality of points by means of fastening devices such as rivets 24, extending through openings 25 in flattened portions 26 of the shank. The rivets illustrated have split ends 27 for cooperating with the heads 28 thereof to draw the shank of the frame into rigid contact with the battery case.

The lower end 29 of the shank terminates short of the flange 16 of the cap 14, and the rivet 24 pivotally carries a resilient contact or switch arm 30 thereon between the terminal of the shank and the tubular wall, to make an electrical connection between the cap 14 and the shank 23 when the switch arm is swung from a horizontal to a vertical position, as indicated by the solid and dotted lines in FIG. 3. The battery case may be marked with suitable indicating means, such as "on" and "off" as indicated at 31 and 32.

The upper end of the shank terminates short of the metal of the upper cap 6 and curves laterally away from the case to provide a lateral arm 33, and which curves upwardly and inwardly as indicated at 34 to provide an upper arm 35 that terminates over the hook or loop 10 in upwardly spaced relation therewith to provide a gap 36. Thus a frame of gooseneck shape is provided, in the manner of a coping saw frame, to support the cutting element 11 in tension. The cutting element is a wire 37 of electrically resistant material that is fixed to the hook 10 by means of solder or the like. The wire extends across the gap 36 and has a loop 38 that seats in a notch 39 in the terminal end 40 of the upper arm 35 of the frame. In order to provide the loop 38, the end of the wire may be brought over the arm and twisted about itself, as indicated at 40. The gooseneck portion of the frame has sufficient resiliency to retain the wire in taut condition and to keep the loop in the notch when the tool is used, however, the loop is readily releasable from the notch by squeezing the arm portions of the frame together.

In preparing the tool for use, the closure cap 14 is removed, together with the spring 22, and the batteries 19 are inserted in tandem, with the positive poles thereof in position to engage, respectively, the disk portion 7 of the upper cap and the bottom of the leading dry cell. The lower battery is followed by insertion of the spring 22 and the closure cap 14 is reapplied to the tubular casing 3, care being taken to note that the switch arm 30 is in open position, as shown in FIGS. 1 and 3. Upon reapplication of the closure cap, the spring 22 is compressed to support and retain the batteries in electrical contact with each other and the positive pole 20 in electrial contact with the disk portion 7.

When the switch arm is shifted to make contact with the flange 16 of the closure cap 14, an electrical current is established from the positive pole 20, resistance wire 37, arms 35 and 33 and the shank 23 of the gooseneck frame, switch arm 30, closure cap 14 and spring 22, to the casing of the lower battery. The wire 37 offers resistance to flow therethrough for sufficiently warming the wire so that when the case 2 is gripped in the hand and a sheet of thermoplastic is brought into the gap 36 to engage the wire 37, the wire 37 penetrates the plastic for the width of the wire in whatever direction the tool or plastic is guided, to shape the plastic or cut out a shape therefrom.

What I claim and desire to secure by Letters Patent is:
1. A tool of the character described, including a hollow tubular member of nonconductive material providing a handle for said tool, an electrically conductive cap fixed to and closing one end of the tubular member and having an electrically conductive loop portion projecting outwardly from near a center of said cap, an electrically conductive cap removably secured to and closing the other end of the tubular member, said tubular member providing a compartment for containing an electric current supply means having terminals of opposite polarity, with the terminal of one polarity adapted to electrically contact the fixed cap and the terminal of opposite polarity adapted to electrically contact the removable cap, an electrically conductive frame of generally gooseneck shape having an arm with a terminal end spaced from the fixed cap to provide a gap therebetween and having a shank fixed along one side of the tubular member to maintain said gap, said terminal end of the arm having a notch in alignment with said loop portion on the fixed cap, a resistance wire spanning the gap and having one end electrically connected to said loop portion on the fixed cap and having an electrically conductive loop on the other end engaging in said notch to be held in tension by the gooseneck frame, and switch means electrically connecting the shank with said removable cap to establish flow of an electric current through the resistance wire when the switch means is closed.

2. A tool of the character described, including a hollow tubular member of nonconductive material providing a handle for said tool, an electrically conductive cap fixed to and closing one end of the tubular member, an electrically conductive cap removably secured to and closing the other end of the tubular member, said tubular member providing a compartment for containing an electric current supply means having terminals of opposite polarity, with the terminal of one polarity adapted to electrically contact the fixed cap and the terminal of opposite polarity adapted to electrically contact the removable cap, an electrically conductive frame of generally gooseneck shape having an arm with a terminal end spaced from the fixed cap to provide a gap therebetween and having a shank extending along the tubular member, fastening devices securing the shank to the tubular member, a resistance wire spanning the gap and having one end conductively connected to the fixed cap and having the other end conductively connected with the terminal end of the arm of the gooseneck frame, and a switch arm on the fastening device nearest the removable cap for electrical connection of one end of the arm with the shank and movably retaining the other end of the switch arm in contact with said removable cap to establish flow of an electric current through the resistance wire when the switch is closed.

3. A tool of the character described, including a hollow tubular member of nonconductive material providing a handle for said tool, an electrically conductive cap fixed to and closing one end of the tubular member and having an electrically conductive loop portion projecting outwardly from near a center of the fixed cap, an electrically conductive cap removably secured to and closing the other end of the tubular member, said tubular member providing a compartment for containing an electric current supply means having terminals of opposite polarity, with the terminal of one polarity adapted to electrically contact the fixed cap and the terminal of opposite polarity adapted to electrically contact the removable cap, an electrically conductive frame of generally gooseneck shape having an arm with a terminal end spaced from the fixed cap to provide a gap therebetween and having a shank extending along the tubular member, said terminal end of the arm having a notch in alignment with the loop portion of said fixed cap, fastening devices securing the shank to the tubular member, a resistance wire spanning the gap and having one end in electrical connection with the loop portion of the fixed cap and having an electrically conductive loop on the other end engaging in said notch to be held in tension by the gooseneck frame, and a switch arm on the fastening device nearest the removable cap for electrical connection of one end of the arm with the shank and movably retaining the other end of the switch arm in contact with said removable cap to establish flow of an electric current through the resistance wire when the switch is closed.

References Cited by the Examiner

UNITED STATES PATENTS

| | | | |
|---|---|---|---|
| 874,357 | 12/1907 | Dickens | 219—268 |
| 2,004,580 | 6/1935 | Meyer | 219—230 |
| 2,386,409 | 10/1945 | Saffady | 30—116 |
| 2,727,132 | 12/1955 | Hills | 219—223 |
| 2,916,595 | 12/1959 | Priestly | 30—140 X |

ANTHONY BARTIS, *Primary Examiner.*